April 16, 1929.   J. W. DENNING   1,709,465
SLAT FENCE MACHINE
Original Filed April 28, 1927   7 Sheets-Sheet 2
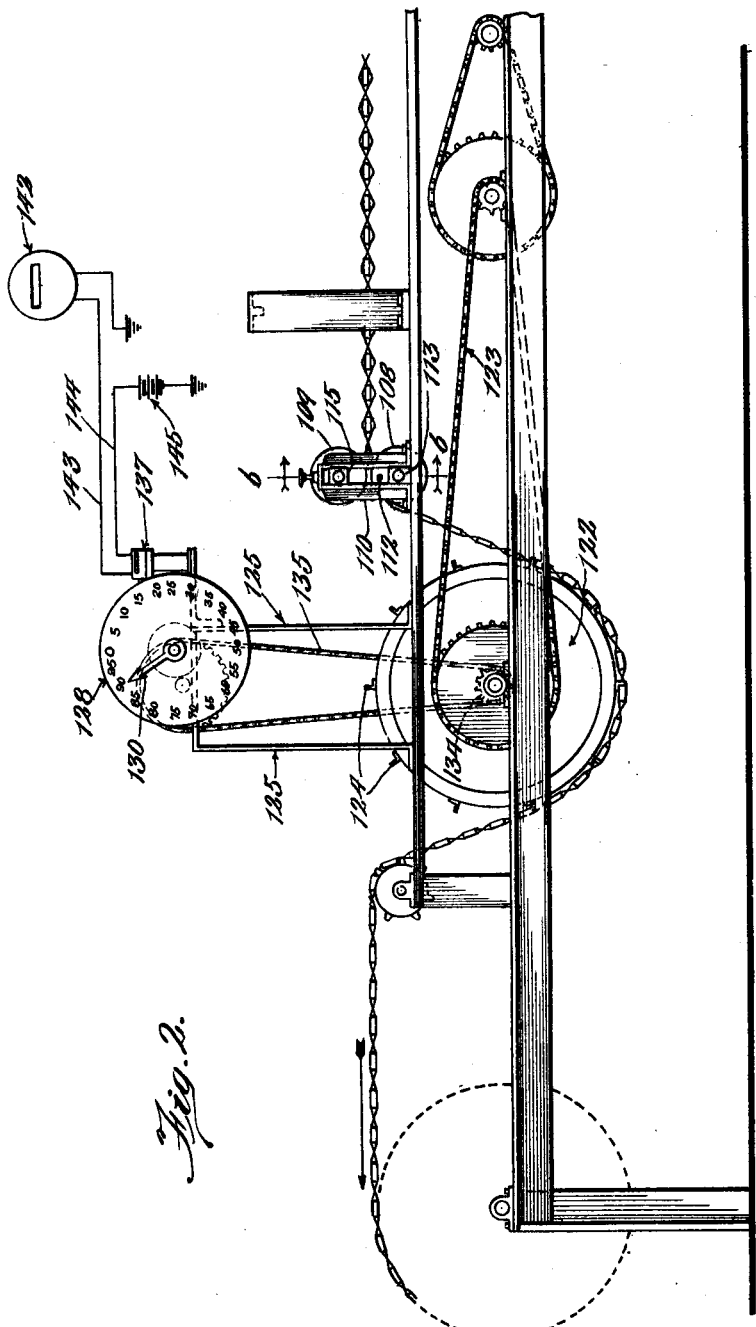

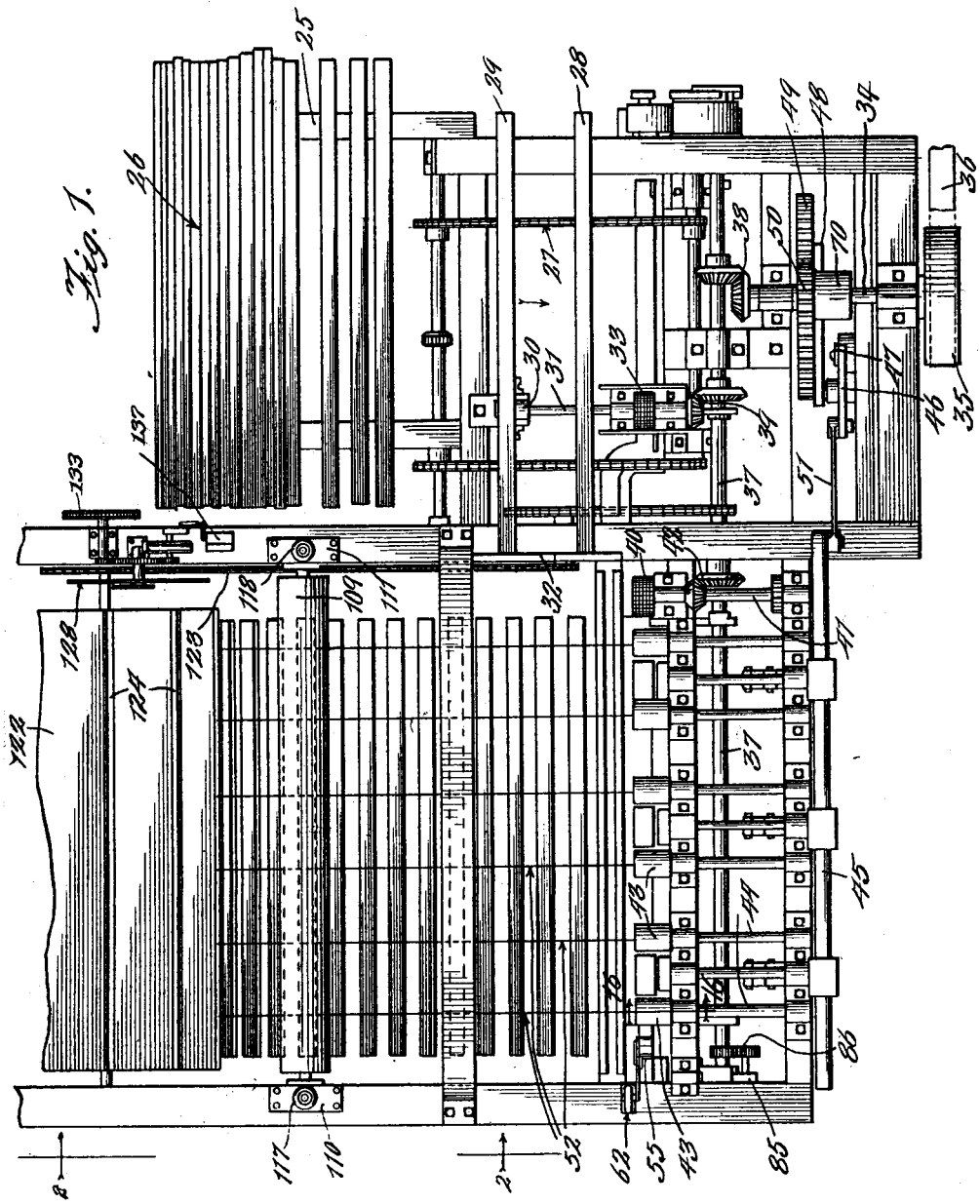

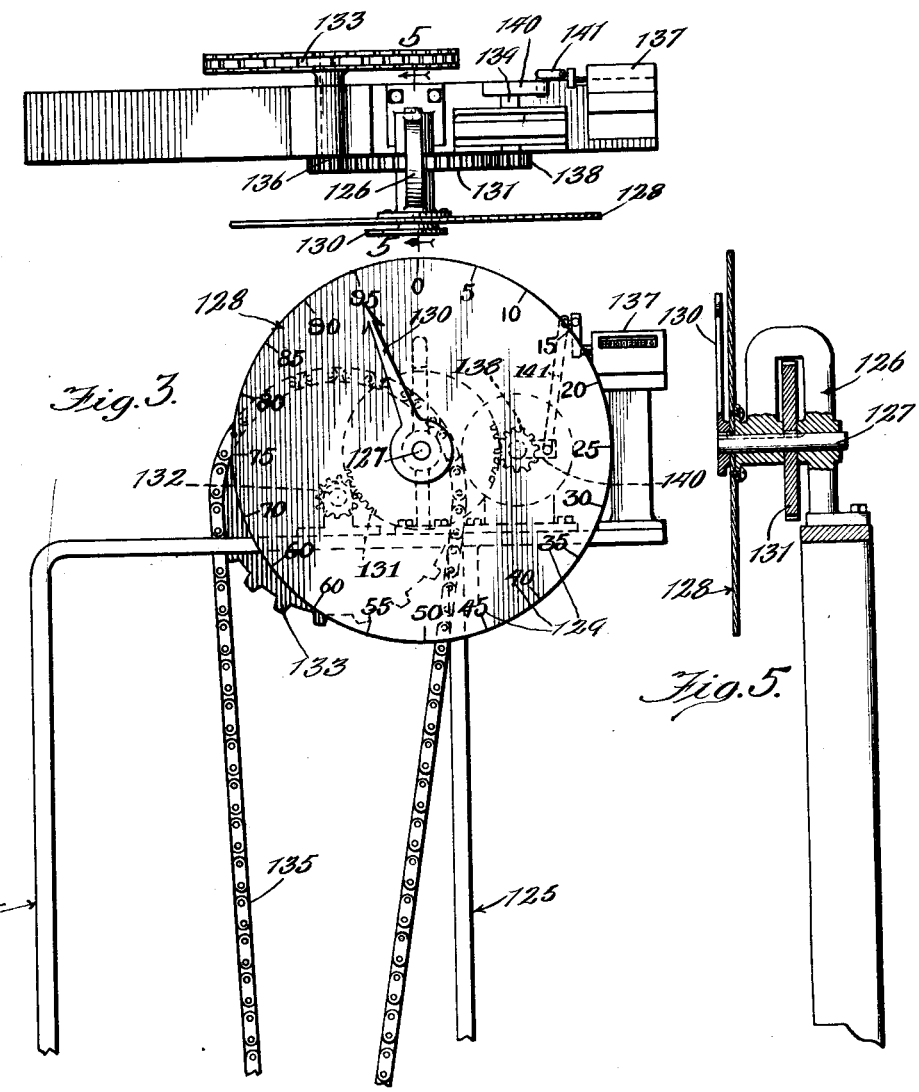

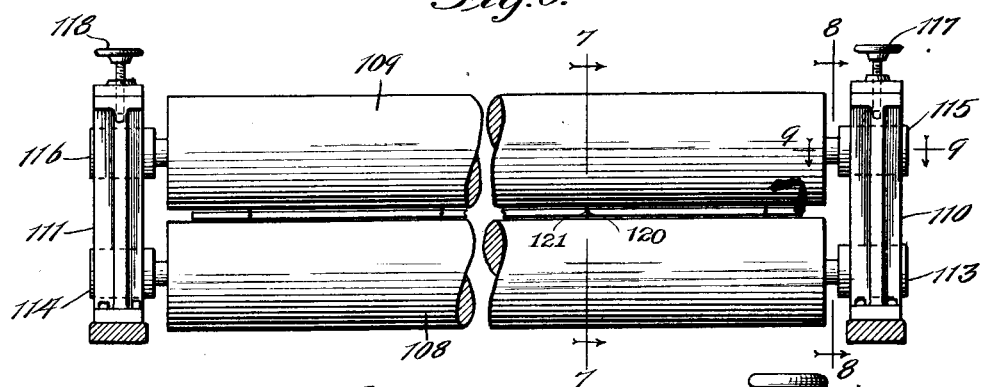
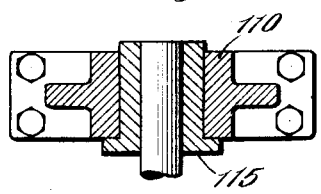
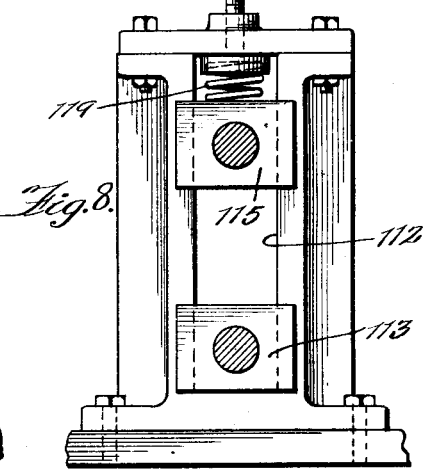
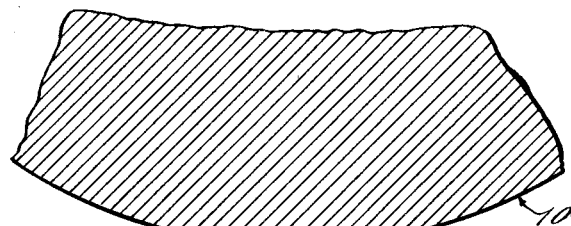
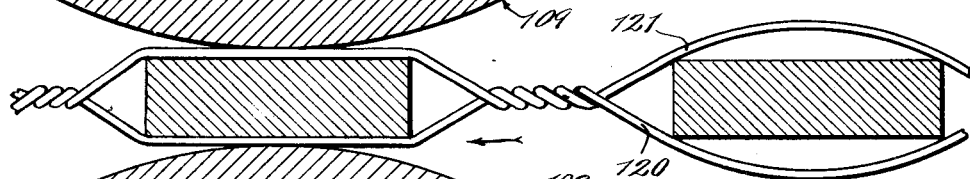
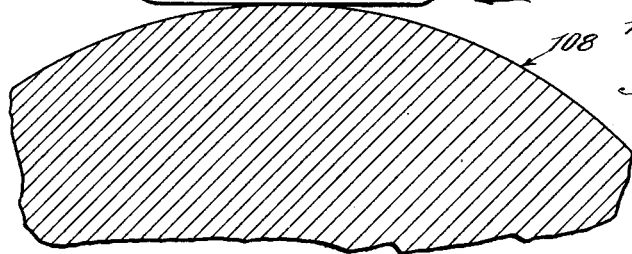

April 16, 1929.  J. W. DENNING  1,709,465
SLAT FENCE MACHINE
Original Filed April 28, 1927   7 Sheets-Sheet 5
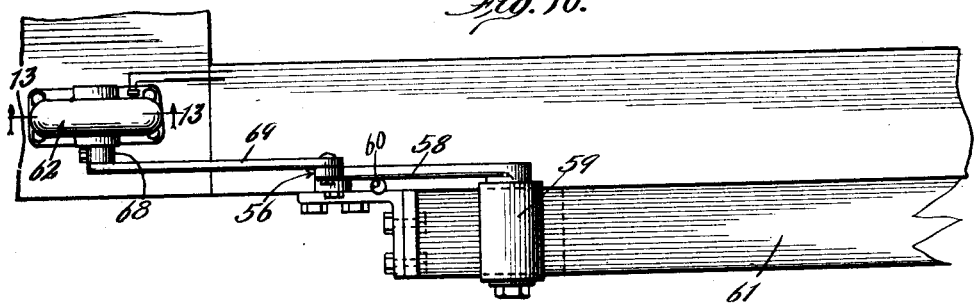
Fig. 10.
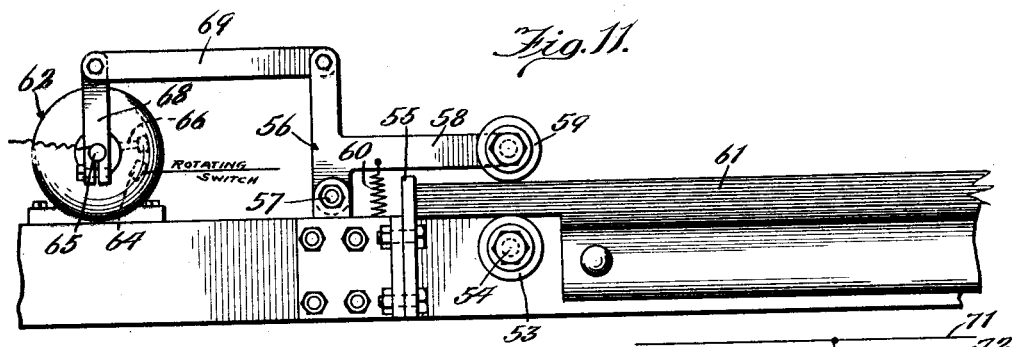
Fig. 11.
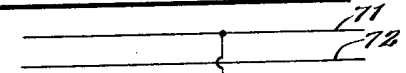
Fig. 15.
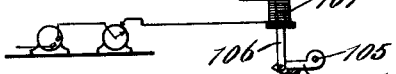
Fig. 12.   Fig. 13.   Fig. 14.
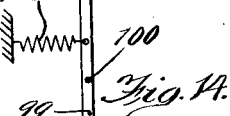
Inventor:
J. Wayne Denning
By Thos. A. Banning Jr.
Atty.

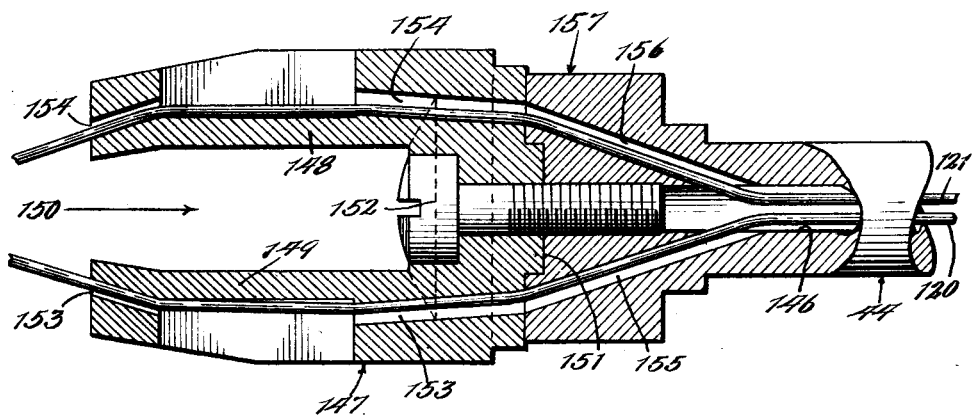
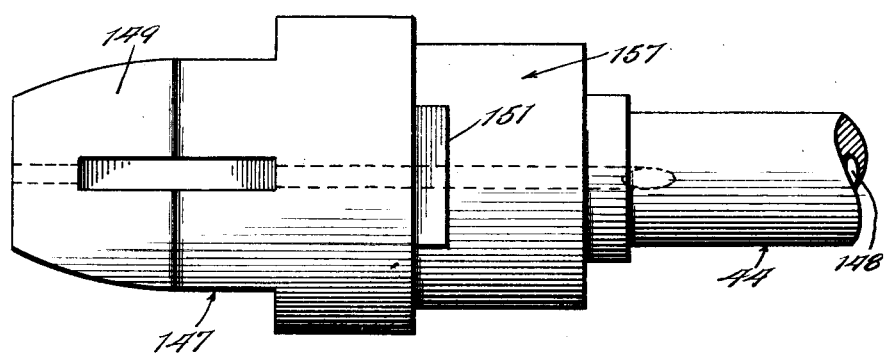
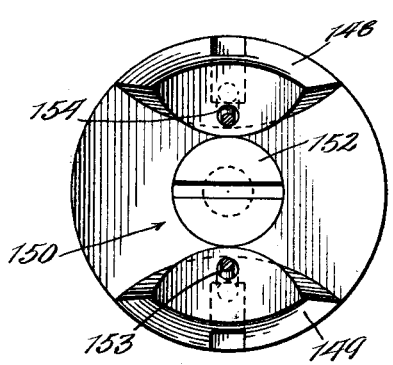

April 16, 1929.  J. W. DENNING  1,709,465
SLAT FENCE MACHINE
Original Filed April 28, 1927    7 Sheets-Sheet 7
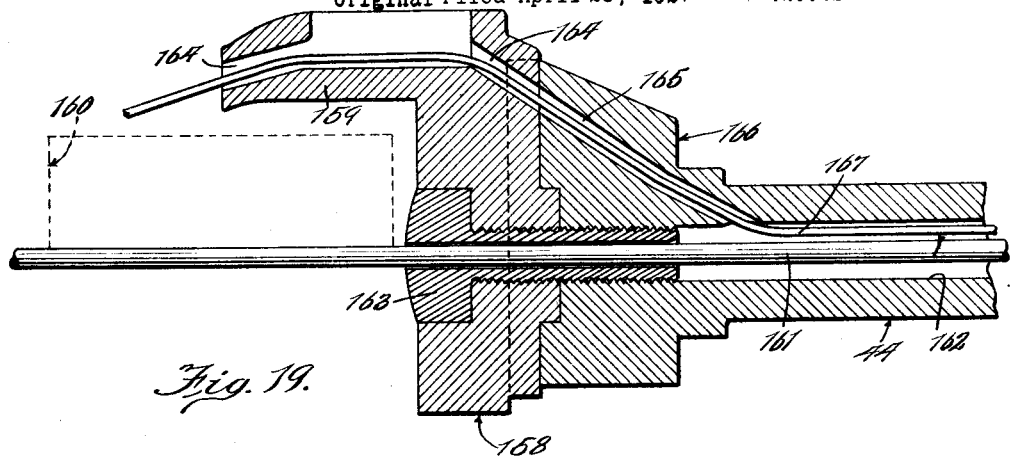
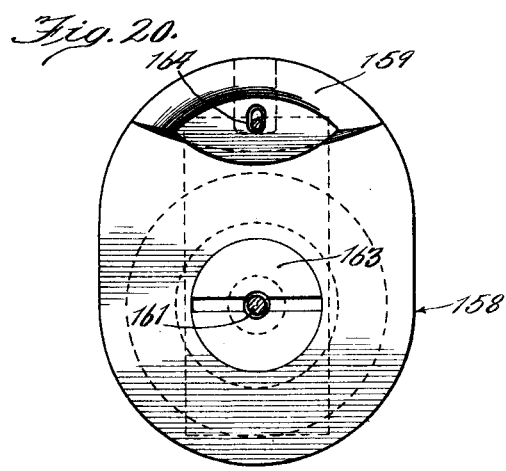
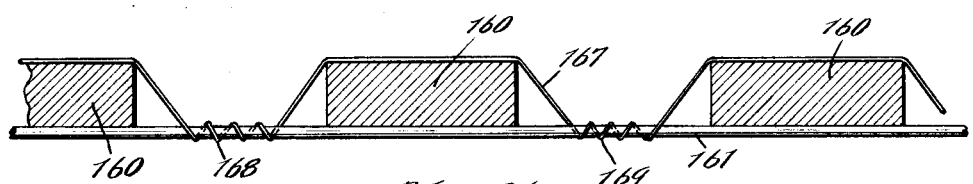
Inventor:
J. Wayne Denning
By Thos. A. Denning
atty.

Patented Apr. 16, 1929.

1,709,465

UNITED STATES PATENT OFFICE.

J. WAYNE DENNING, OF JOLIET, ILLINOIS, ASSIGNOR TO JULIUS P. DISTLER, TRUSTEE, OF PEORIA, ILLINOIS.

SLAT-FENCE MACHINE.

Application filed April 28, 1927, Serial No. 187,200. Renewed September 8, 1928.

This invention has to do with slat fence machines and the like. The slat fence manufactured on the machine herein described is composed of a series of vertical slats or pickets joined together by a series of pairs of longitudinal strand wires. The slats or pickets are of wood or other suitable material and the numbers of pairs of strand wires will depend upon the height of the fencing and the pickets used therefor.

One of the features of the invention relates to the provision of an improved construction whereby the operation of the machine will be automatically discontinued in case any picket does not take the proper position in the machine prior to the operation of the coiling heads by which the strand wires are manipulated. This automatic stop device is so arranged that in case the front end of the picket does not come to proper position in the machine the machine operations will immediately stop, thereby avoiding the manufacture of imperfect fencing and also making it unnecessary to provide attendants to constantly watch the operations of the machine in order to detect such a condition.

Automatic stop devices for machines of this general character have been known in the past. However, the construction herein disclosed is of a simplified form and is so arranged that the control of the driving clutches and related parts may be conveniently effected by electric impulses.

In connection with the foregoing it is a further object to make use of an electro-magnetic clutch for controlling the driving operations, and to provide for the operations of this clutch by means of electric impulses or currents controlled by a suitable switch properly placed with respect to the position into which the slats are supposed to be normally introduced.

A further object of the invention is to provide a supplemental switch by means of which the operator himself can readily control the driving operations so as to immediately stop the machine himself for any cause.

A further feature of the invention relates to the provision of an improved counting device by means of which the length of fencing produced on the machine will be indicated at all times; and also to indicate the amount of fencing produced on the reel which is being formed at any instant. This counting and indicating device is driven by means of a sprocket wheel or drum which is at all times in direct association with the slat fencing so that the length of fencing produced is accurately measured because the spacing of the slats is a definite and fixed amount.

A further object in connection with the foregoing is to make provision for giving an indication of the amount of fencing produced, at a distant point, for example in the office of the factory, so that the amount of fencing so produced may be readily ascertained without having to go to the machines themselves for the reading of an indicator.

A further feature of the invention relates to the provision of means for flattening the longitudinal strand wires at the positions where they embrace the slats, thus producing a more merchantable product and at the same time straightening out the strand wires as much as possible. The desirability of this result will be appreciated when it is explained that there is always a tendency for the strand wires to bow slightly at the positions where they embrace the slats, and when the strand wires are afterwards placed under tension, as when stringing the fence, they will give slightly in these bowed portions so that the fencing is apt to become loose and require tightening. By initially flattening the strands so as to remove these bowed portions, this tendency is greatly reduced or eliminated and the fence will stay tight when it has been strung.

A further feature of the invention relates to the provision of an improved construction of coiler head by which the strand wires are twisted at the positions between the slats, the twisting being alternately in one direction and then in the other. The improved coiler heads herein disclosed are removable from their respective chucks in a very simple manner, and by the removal of a single tap screw from each coiler head so that the coiler heads can be readily changed with a very small amount of work. This will make it possible to substitute new coiler heads, either of new sizes or to replace worn parts or for other reasons.

In connection with the foregoing it is a further object to make provision for keying coiler heads to their respective chucks so that the rotative force will be communicated by these keyed connections and without undue strain on the tap screws themselves.

A further feature of the invention relates to the provision of an improved type of slat fencing in which one of the strand wires is made appreciably heavier than the other one so that the heavier strand wire will extend along and in contact with one side of the respective pickets, and substantially without any deflection or binding at points between the pickets. The other strand wire which is relatively light, is readily bent out and around the respective pickets, and it serves principally the function of drawing the various pickets against the heavy straight strand wire.

When this type of fencing is strung the heavy strand wires are intended to carry substantially all of the longitudinal strain; the light strand wires serving principally to hold the pickets firmly in a place against the heavy strand wires. Inasmuch as the heavy strand wires are straight it follows that this type of fencing will remain tight when once strung, since there are no bends of the heavy wires which are subject to giving under tension.

A further object of the invention relates to the provision of suitable coiler heads for making this type of fencing; and said coiler heads are also removably mounted on their respective chucks for the reasons already explained.

Other objects and uses of the invention will appear from a detailed description of the same which consists in the features of construction and combination of the parts hereinafter described and claimed.

In the drawings:

Fig. 1, shows a plan view of a slat fencing machine of familiar type having applied thereto the various improvements constituting the features of the present invention;

Fig. 2 shows a fragmentary side elevation on the line 2—2 of Fig. 1, looking in the direction of the arrows;

Fig. 3 shows a fragmentary side elevation of the counting mechanism on enlarged scale as compared to Fig. 2;

Fig. 4 shows a plan view corresponding to Fig. 3;

Fig. 5 shows a corresponding section on the line 5—5 of Fig. 4, looking in the direction of the arrows;

Fig. 6 shows a face view of the strand wire flattening rolls on enlarged scale as compared to Figs. 1 and 2, being a section on the line 6—6 of Fig. 2, looking in the direction of the arrows, but on enlarged scale;

Fig. 7 shows a fragmentary section through the flattening rolls together with the fencing piece between them showing the manner in which the strand wires are flattened out; and is a fragmentary section of enlarged scale on the line 7—7 of Fig. 6, looking in the direction of the arrows;

Fig. 8 shows a cross section on the line 8—8 in Fig. 6 looking in the direction of the arrows;

Fig. 9 shows a fragmentary horizontal section on the line 9—9 of Fig. 6, looking in the direction of the arrows;

Fig. 10 shows a fragmentary plan view of the switch mechanism which is controlled by the end of the freshly introduced slat; being on enlarged scale as compared to Fig. 1;

Fig. 11 shows a fragmentary side elevation corresponding to Fig. 10;

Fig. 12 shows diagrammatically the electric circuits controlled by the device of Figs. 10 and 11;

Fig. 13, shows a fragmentary section on the line 13—13 of Fig. 10 looking in the direction of the arrows;

Fig. 14 shows a fragmentary detail view of a modified form of clutch device, being a friction clutch in place of the magnetic clutch of the previously described form;

Fig. 15 shows a modified form of electric circuit for controlling the friction clutch of Fig. 14;

Fig. 16 shows a fragmentary longitudinal section through the coiler head, being a fragmentary section on the line 16—16 of Fig. 1, looking in the direction of the arrows;

Fig. 17 shows a side elevation corresponding to Fig. 16;

Fig. 18 shows an end view of Fig. 17;

Fig. 19, shows a cross section through a modified form of coiler head which is adapted to place a heavy strand wire straight along one face of the slats, and a relatively light strand wire along the other face of the slats;

Fig. 20 shows an end view corresponding to Fig. 19; and Fig. 21 shows a fragmentary section through a piece of slat fencing having a relatively heavy straight strand wire along one side of the slats and a relatively light strand wire along the other side of the slats in the manner already explained, being a type of fencing adapted to be produced by coiler heads such as shown in Figs. 19 and 20 when the slats are properly positioned therein.

Referring first to Fig. 1 in particular, the machine therein illustrated includes a suitable table or the like 25 whereon the slats 26 are placed. The slats are individually fed from the table 25 by a suitable transfer or conveying mechanism 27, the same being provided with flights or other spacing means of the usual type so that the consecutive slats 28 and 29 will be carried forward at the proper timing.

As the slats advance in the direction of the arrow in Fig. 1 they encounter a roller 30 on shaft 31, which roller throws the slats towards the left end against the face of the abutment 32 by which their ends are properly lined up. Further advancement of the slats so aligned, in the direction of the arrow in Fig. 1, brings them between a pair of rollers, one of which, 33, appears in Fig. 1. These rollers rotate in such directions, and are at a proper separation from each other, so that the slats will be picked up and moved towards the left one at a time and thereby fed into position with respect to the coiler heads.

A main shaft 34 is driven by a pulley 35 by means of a belt 36 or in any other convenient manner. This shaft 34 in turn drives a counter shaft 37 through the medium of beveled gears 38; and the rollers 33 and the shaft 31 already referred to are driven from the counter shaft 37 by means of other beveled gears 39.

In line with the advancing rolls 33 there is another pair of advancing rolls 40, one of which is driven by the shaft 41 from the counter shaft 37, also through the bevel gears 42.

The arrangement is such that when a slat is once picked up by the advancing rollers 33 it will, at the proper time, be moved towards the left and picked up by the advancing rolls 40 and by them delivered into place.

At the left hand side of the machine there is a series of coiler heads 43 carried by the coiling shafts 44, which shafts are suitably journaled and can be reciprocated first in one direction and then in the other. For this purpose there is a rack bar 45 which is suitably mounted in the frame of the machine in such position that it can be moved back and forth in proper time; and said rack bar is geared to the coiler head shafts 44 and serves to rotate them first in one direction and then in the other as the rack bar is reciprocated. The rack bar reciprocations are performed in any convenient manner and in timed relationship. In the construction illustrated this is done by means of an arm 46 pivoted to the frame at the point 47 and operated back and forth by a cam 48 on a gear wheel 49. Said gear wheel 49 is driven from the shaft 34 by a pinion 50. A link 51 connects the swinging arm 46 with the rack bar 45 so that the rack bar is moved back and forth in proper timed relation in respect to the other parts.

The pairs of strand wires, diagrammatically shown in Fig. 1 as 52, are fed through the coiler heads on both sides of the slats standing in position, so that as soon as a new slat takes its position the rotation of the coiler heads will twist the pairs of strand wires and thus tie the slat in position. Thereafter all of the pairs of strand wires are drawn away from the coiler heads, a distance of one slat space, the coiler heads stand idle, a new slat is advanced into position, the coiler heads are rotated in the reverse direction so that they tie the new slat into place, and the operation is repeated.

The mechanisms thus far described are similar to those disclosed in Letters Patent of the United States No. 943,008, issued December 14, 1909, for improvements in slat fence machines to Joseph M. Denning.

As each slat is moved into position adjacent to the coiler heads its left hand end is supposed to pass over a roller 53 having a fixed axis 54, and the slat is supposed to come to rest against a fixed stop 55.

A bell crank 56 is pivoted to the machine at the point 57, the horizontal arm 58 of said bell crank carrying a roller 59 above the position of the roller 53. A spring 60 tends to draw the arm 58 of the bell crank 56 down; but as soon as the end portion of a new slat 61 comes properly into place beneath the roller 59 the bell crank 56 is rocked.

A switch 62 is located at the left side of the bell crank 56. Said switch 62 has a hollow compartment 63 within which there is a fixed contact 64. A shaft 65 extends across the switch compartment and reaches to the outside thereof, and said shaft carries a swinging arm 66 within the compartment, said arm having a contact 67 which is adapted to engage the contact 64 when the arm is moved down slightly from the position illustrated in Fig. 13.

The contact 64 is connected to one side of an electric control circuit, and the contact 67 is connected to the other side of an electric control circuit, these connections being made through suitable wires presently to be explained.

A crank arm 68 is secured to the projecting end of the shaft 65 and a link 69 connects the crank arm 68 with the bell crank 56. As a result of the foregoing arrangements whenever the picket is removed from the position beneath the roller 59, the bell crank 56 is lowered so as to establish connection between the contacts 64 and 67, thus temporarily closing an electric circuit. This circuit is opened when a picket comes into position beneath the roller 59. The shaft 34 drives the main gear 49, cam 48, and bevel gears 38, through the medium of a magnetic clutch 70 (see Fig. 1). As long as this clutch is energized the drive connection is maintained but upon de-energizing the clutch the driving connection is broken.

The electric circuits for controlling this clutch are illustrated diagrammatically in Fig. 12 in which the clutch is diagrammatically illustrated in a conventional manner as a box 70.

The electric current is supplied from the mains 71 and 72. A relay 73 is provided, said relay including an armature 74 which works in conjunction as a stationary contact 75 to open and close the main circuit of the clutch 70. For this purpose a lead 76 connects the armature to the main 72, a lead 77 connects the main 71 to the clutch and a lead 78 connects the clutch to the sationary contact 75.

The armature 74 will remain in either of the two positions in which it is placed, either the closed circuit position illustrated in Fig. 12 or the open circuit position which will be produced by moving the armature away from the contact 75.

There is a solenoid or pair of solenoids 79 mounted in position so that when energized said solenoid will draw the armature 74 to the open circuit position. The solenoid 79 connects to the main 71 by a lead 80. The solenoid 79 also connects by a lead 81 to a rotary switch 82 and then by a lead 83 to the contact maker 62 already described. From the contact maker 62 another lead 84 connects to the main 72.

The rotary switch 82 is placed at a convenient point in the machine and operates in timed relation with respect to the movements of the machine; said switch is shown as mounted on the frame at the point 85 (see Fig. 1) and is driven from the shaft 37 or an extension thereof by the gears 86. The arrangement is such that every time the fencing mechanism comes to a certain predetermined point the contacts of the rotating switch 82 are closed, and current will be sent through the solenoid 79 provided that the contact maker 62 is also closed at that time. This would be the case if the slat did not come to proper position beneath the roller 59 so as to raise the bell crank 56 against the force of the spring 60. In this way the armature 74 will be drawn to the open circuit position at the proper time to stop the machine provided the new slat has not come into proper position.

In order to supplement the automatic operations just described a separate switch 87 may be provided at a convenient point for operation by the mechanic, said switch being bridged across the rotary contact maker and mechanism by leads 88 and 89 as shown in Fig. 12. Upon closing the switch 87 current will be sent through the solenoid 79 and thus draw the armature 74 over so as to open the circuit and stop the machine.

In order to start up the machine it is necessary to throw the armature 74 back into the contact position. For this purpose another solenoid or solenoids 90 is provided in position to draw the armature 74 to the closed circuit position. Said solenoid 90 is controlled by a switch 91 bridged across the mains 71 and 72 by the leads 92 and 93. Upon closing the switch 91 the solenoid 90 is energized and the machine will be started up.

In Figs. 14 and 15 I have shown the details of a modified form of control device including a friction clutch instead of an electromagnetic clutch at the point 70. This friction clutch includes the plates 94 and 95 on the two shafts 96 and 97 so that when said plates are forced together the drive connection is established. The plate 95 is carried by a sleeve 98 splined to the shaft 97. A control lever 99, pivoted at the point 100, has its lower end bifurcated at 101 and engaging the sleeve 98. When the upper end 102 of the lever is drawn over to the right in Fig. 14 against the force of the spring 103 the clutch is engaged for driving operations.

A hook 104, pivoted at the point 105 will engage the upper end 102 to hold the parts in the driving position. Armature 106 is connected to the hook 104 and is under the influence of a solenoid 107. When said solenoid is energized, the hook 104 is drawn over so as to release the lever and allow the spring 103 to disengage the clutch.

Referring to Figs. 1 and 2 in particular, the fencing is drawn away from the observer in Fig. 1 as it is completed. It first passes between a pair of straightening rollers 108 and 109 which are journalled in the brackets 110 and 111. These brackets are vertically slotted as shown at 112 in Fig. 8. The lower roller 108 has its ends working in the journal blocks 113 and 114 which stand at the lower ends of the bracket slots. The roller 109 has its ends journaled in the blocks 115 and 116 which also work in the bracket slots 112. Hand wheels are provided at the upper ends of the brackets 110 and 111 for exerting pressure on the upper blocks 115 and 116 respectively so that the amount of pressure to which the fence will be subjected can be readily adjusted through the medium of the spring 119 (see Fig. 8).

As the fencing passes between the rollers 108 and 109 the strand wires 120 and 121 are flattened out so that they lie snug against the faces of the slats. In this way the strand wires are initially elongated so that when the fence is strung and placed under tension it will not elongate due to straightening of strand wires.

After the fencing passes the straightening rolls 108 and 109 it passes beneath a relatively large drum 122 which is journaled in the frame and is driven in timed relationship to the coiler head and other operations by means of a chain drive 123, the details of which do not need to be explained at large. This drum 122 is provided with a series of flights or sprocket teeth 124 which are placed at proper spacing to come between successive slats or groups of slats.

In the particular construction illustrated the flights 124 come between groups of three slats. Owing to the fact that the drum 122 rotates in timed relation to the length of the fencing produced its revolutions may be used as a measure of the amount of fencing produced. For this purpose a suitable counting device is provided, the same being geared to or driven by the drum 122. Said counting device is mounted on a bracket 125 reaching up from the frame of the machine. On said bracket is mounted a head 126 within which is journaled a suitable shaft 127. On the front face of the head 126 there is secured a dial 128 and around the periphery thereof are placed the markings 129 representing the length of the fencing produced.

The projecting end of the shaft 127 carries a pointer 130 which travels over the face of said dial; and the shaft 127 carries a gear wheel 131 which is accommodated in the head 126 by reason of said head being bifurcated as shown in Fig. 5.

Journaled on the upper end of the bracket 125 is another stub shaft 132. The back side thereof carries a sprocket 133 which is driven from the drum 122 by a small sprocket wheel 134 and chain 135. The front end of the shaft 132 carries a pinion 136 which meshes with the gear 131 and drives the same, thereby moving the pointer 130 around the dial in timed relationship to the delivery of fencing.

This pointer serves as a convenient means of reading the length of fencing in relatively short quantities, for example in 100 foot lengths. In order to keep constant and accumulated record of the production of the fencing I have provided a counter 137 also on the upper end of the bracket 125. This counter is driven by a pinion 138 which also meshes with the gear 131, said pinion 138 being mounted on a stub shaft 139. To the back side of said stub shaft is connected a crank 140, and said crank connects to the counting device 137 by a link 141.

In this way the rotations of the gear 131 are transformed into vertical reciprocations of the link 141 whereby the counting device 137 is properly actuated. If desired the mechanism may also be connected to another counting device located at a distant point, for example in the office of the factory. Thus in Fig. 2 I have shown an electrically operated counter 142 connected to the counter 137 by means of wires 143 and 144 which are supplied with current by battery 145, the arrangement being such that the counter 142 will keep step with the counter 137, or at any rate will give a correct indication of the fencing produced.

Referring to Figs. 16 and 17 and 18 I have therein illustrated in detail an improved construction of coiler head which is very well adapted for use in this type of machine. The shaft 44 is hollow as shown at 146 so that the two strand wires 120 and 121 may be admitted through the center of the shaft.

The coiler head 147 is secured to the end of the shaft in such a manner that it can be readily removed for replacement or repair. This coiler head 147 is bifurcated, having the two parallel fingers 148 and 149 which are separated to provide a space 150 (see Fig. 16), to accommodate the newly introduced slat.

The adjacent ends of the shaft 44 and of the coiler head 147 are formed with companion tongue and groove surfaces as shown at 151, extending diametrically across the structure, so that the rotary force of the shaft will be readily communicated to the coiler head. The machine or tap screw 152 may be set into place axially by introduction through the slotted opening 150 as shown in Fig. 16.

Reaching lengthwise through each of the fingers 148 and 149 are the wire passages 153 and 154 for the two strand wires 120 and 121, respectively. These passages 153 and 154 of the coiler head communicate respectively with corresponding angularly extending passages 155 and 156 in an enlargement 157 of the shaft 44. Said passages 155 and 156 terminate at their inner ends at the central passage 146 already referred to so that the strand wires are in this way fed into the passages 153 and 154.

It will be noted that this coiler head structure is very well adapted to the present work because it can be readily removed for replacement or adjustment and with a minimum amount of labor.

Referring to Figs. 19 and 20, in this case the coiler head 158 is provided with only a single finger 159, and the same is laterally displaced from the center line of the coiler head and shaft 44 a sufficient distance to completely accommodate the slat 160 at one side of the center line as shown in Fig. 19. Therefore one of the strand wires 161 may pass directly from the center bore 162 of the shaft 44, and through the center of the tap screw 163 and in a straight line past one side of the slat 160 without bending. The finger 159 is provided with a passage 164 which communicates with an angularly extending passage 165 in the enlargement 166 on the end of the shaft 44, said passage 165 communicating at its inner end with the passage 162. In this way the other strand wire 167 may be delivered from the passage 162 up through the passages 165 and 164 to the other side of the slat.

The coiler head structure shown in Figs. 19 and 20 is very well adapted for producing the type of fencing shown in Fig. 21 wherein it will be noted that the slats are all fully accommodated at one side of the straight relatively heavy strand wire 161; the relatively light strand wire 167 passing over the successive slats and being coiled around the heavy strand wire 161 at the points 168 and 169, first in one direction and then in the other. Fencing of the type shown in Fig. 21 is intended to take all of the longitudinal strain in the heavy strand wires 161; it being intended that the lighter strand wires 167 are primarily for the purpose of holding the slats in position against the straight relatively heavy strand wires 161.

The type of fencing shown in Fig. 21 is particularly well adapted for relatively heavy service due to the fact that the strand wires 61 are comparatively large; and the stiffness of said wires increases as the cube of the diameter. Therefore a much stiffer fence is provided by the use of a given amount of metal in the strand wires where the strand wires on one side are straight and relatively large, those on the other side being much smaller and bent around the consecutive slats as illustrated in Fig. 21.

The foregoing feature is of especial advantage for the following reason: At the points where the staples engage the strand wires in order to fasten them to the posts there is a severe bending tendency tending to bend the strand wires at a very sharp angle due to side pressure being exerted by wind, snow and other natural forces. By using strand wires of relatively large diameter, (which is possible with the type of fence shown in Fig. 21 and without the use of additional amounts of metal), I am able to take care of this bending force to best advantage.

This advantage is to be definitely compared with the case of slat fencing in which two relatively small diameter strands are "cabled" together at positions between the slats, since when the staple is driven into the post to secure such cabled strand to the post, the two wires of the cable will lie flat against the post at the position of the staple so that their combined stiffness is only the stiffness of two such small wires, which is very much less than the stiffness of a single larger wire, such as contemplated in the fencing shown in Fig. 21.

There is a further distinct advantage in the use of fencing of the type disclosed in Fig. 21 which will be evident from the following explanation:

When using fencing such as that shown in Fig. 7 for example in which both of the strand wires 120 and 121 are built around the consecutive pickets, as soon as this fence is placed under tension there is a tendency for the strands to straighten out at the points where they pass over the edges of the pickets. This results in a tendency for the strands to actually imbed themselves slightly in the edges of the pickets thereby injuring the appearance of the fence and also actually weakening the pickets to a serious degree.

Furthermore, this straightening action results in a slight increase in the length of the fencing between consecutive pickets, which action is cumulative throughout the length of the fencing and as a result a fence which was originally installed taut will soon become lengthened to such an extent that it is saggy and unsatisfactory. This action is entirely distinct from any actual stretch of the strand wires themselves and is due entirely to a slight straightening of the strand wires at the positions of the pickets.

On the contrary the type of fencing shown in Fig. 21 entirely eliminates this objection because practically all of the tensile strain is taken by the large strand wires 161 which are already straight and therefore not subject to any elongation of the nature hereinafter referred to. Fencing such as that shown in Fig. 21 will not increase its length except under the extreme condition of actual stretch of the strand wires and furthermore the corners of the pickets will not be damaged by any tendency of the strand wires to imbed themselves in the wood.

I claim:

1. In a slat fence machine including means for feeding pairs of longitudinal strand wires, means for transversely positioning slats between the pairs of strand wires, coiler heads for twisting the pairs of strand wires alternately in opposite directions to thereby twist together the pairs of strand wires at positions intermediate between the slat positions, and means for drawing out the completed fencing, of a sprocket drum mounted in the path of travel of the fencing, a pair of flattening rolls also mounted in the path of travel of the fencing at a position in advance of the sprocket drum, the fencing passing between said flattening rolls and then to the sprocket drum, suitable reeling mechanism in position to receive the completed fencing delivered from the sprocket drum, a counter, and an operative connection from the sprocket drum to the counter operative effectively to integrate the length of fencing produced based on revolutions of the drum, substantially as described.

2. In a slat fence machine the combination with means for feeding pairs of strand wires, means for feeding slats into position transversely of the strand wires, and coiler heads adapted to rotate alternately in opposite directions to thereby twist the strand wires together first in one direction and then in the other, of suitable reeling and pull out mechanism to receive the completed fencing, a pair of flattening rolls mounted in the path of travel of the fencing between the coilers and the reeling mechanism, and means for forcing the flattening rollers towards each other under spring tension to thereby straighten the strand wires and thus eliminate the tendency of the said wires to straighten under tension when in service, substantially as described.

3. In a machine for manufacturing a slat fence, the combination of means for feeding pairs of strand wires, means for feeding slats into position between strand wires and transversely thereof, coilers for the strand wires and means for rotating the coilers to thereby twist together the strand wires at positions between the consecutive slats, of a sprocket drum mounted in the path of travel of completed fencing and having sprocket flights adapted to enter between consecutive slats and thereby cause the drum to rotate in definite relationship to the length of fencing produced, suitable counting mechanism adapted to integrate according to length of fencing and an operative connection between the sprocket drum and the counting device, substantially as described.

4. In a slat fence machine the combination of means for feeding pairs of strand wires, means for feeding slats transversely into position between the pairs of strand wires, suitable coilers, means for rotating said coilers in timed relationship to the slat feeding and other movements to thereby twist the strand wires together at positions intermediate between consecutive slats, a driving element for all of said devices, an electromagnetic clutch intermediate between said driving element and said devices, suitable circuits for energizing said clutch, an electromagnetic relay in said circuits and adapted in one position to close the clutch circuit and in another position to open said circuit, a circuit for said relay, a switch in said relay circuit, means for opening and closing said switch in timed relation to the movements of the fence machine elements, another switch in said relay circuit, means normally moving said switch to closed circuit position, and means for moving said switch to open circuit position when a slat occupies the correct position for the strand coiling operation, substantially as described.

5. In a slat fence machine the combination of means for feeding pairs of strand wires, means for feeding slats transversely in position between the pairs of strand wires, suitable coilers, means for rotating said coilers in timed relationship to the slat feeding and other movements to thereby twist the strand wires together at positions intermediate between consecutive slats, a driving element for all of said device, an electromagnetic clutch intermediate between said driving element and said devices, suitable circuits for energizing said clutch, an electro-magnetic relay in said circuits and adapted in one position to close the clutch circuit and in another position to open said circuit, and means for energizing said relay to open the clutch circuit when a slat does not occupy the correct position in the machine immediately prior to a coiling operation, substantially as described.

6. In a slat fence machine the combination of means for feeding pairs of strand wires, means for feeding slats transversely into position between the pairs of strand wires, suitable coilers, means for rotating said coilers in timed relationship to the slat feeding and other movements to thereby twist the strand wires together at positions intermediate between consecutive slats, a driving element for all of said devices, a clutch intermediate between said driving element and said devices, an electromagnetic control for said clutch, and means for moving said electromagnetic control into unclutching position when a slat does not occupy the correct position in the machine and in timed relationship, substantially as described.

7. In a slat fence machine the combination of a series of hollow chuck shafts, removable coiler heads, for the ends of said shafts, companion clutch faces on the co-operating ends of the shafts and coiler heads, each coiler head being bifurcated by a transverse slat receiving slot, an axial tap screw reaching through the base portion of each coiler head and axially into the chuck shaft to retain the coiler head in a position thereon, and there being longitudinal strand wire passages in the bifurcations of each coiler head having their inner ends in communication with the central passage of the corresponding chuck shaft substantially as described.

8. In a slat fence machine the combination of a series of chuck shafts, removable coiler heads for the chuck shafts, there being companion clutch faces on the the respective coiler heads and their chuck shafts, each coiler head being bifurcated by a transverse slat receiving slot, and means for securing each coiler head in position on its chuck shaft comprising an axial tap screw extending through the base portion of the coiler head and axially into the chuck shaft, substantially as described.

J. WAYNE DENNING.